(12) United States Patent
Washiro

(10) Patent No.: US 8,390,250 B2
(45) Date of Patent: Mar. 5, 2013

(54) NON-CONTACT CHARGE AND COMMUNICATION SYSTEM

(75) Inventor: Takanori Washiro, Kanagawa (JP)

(73) Assignee: Sony Corporation, Tokyo (JP)

( * ) Notice: Subject to any disclaimer, the term of this patent is extended or adjusted under 35 U.S.C. 154(b) by 73 days.

(21) Appl. No.: 13/149,131

(22) Filed: May 31, 2011

(65) Prior Publication Data

US 2011/0316476 A1  Dec. 29, 2011

(30) Foreign Application Priority Data

Jun. 25, 2010  (JP) ................................. 2010-145325

(51) Int. Cl.
*H02J 7/00* (2006.01)
(52) U.S. Cl. ....................................................... 320/108
(58) Field of Classification Search .......... 320/107–115; 362/104, 157, 183, 192
See application file for complete search history.

(56) References Cited

U.S. PATENT DOCUMENTS

| | | | |
|---|---|---|---|
| 2006/0061323 A1* | 3/2006 | Cheng et al. | 320/108 |
| 2007/0279002 A1* | 12/2007 | Partovi | 320/115 |
| 2011/0260532 A1* | 10/2011 | Tanabe | 307/17 |
| 2012/0043932 A1* | 2/2012 | Nakama | 320/108 |
| 2012/0062172 A1* | 3/2012 | Takada et al. | 320/108 |

FOREIGN PATENT DOCUMENTS

JP  2008-295191  12/2008

* cited by examiner

*Primary Examiner* — Wilson Lee
(74) *Attorney, Agent, or Firm* — SNR Denton US LLP

(57) ABSTRACT

Disclosed herein is a non-contact charge and communication system including: non-contact charge apparatus configured to include a power transmitting device that transmits power for a charge by magnetic field coupling and a first communication unit that carries out non-contact communication by electric field coupling; and power receiving apparatus configured to include a power receiving device that receives power transmitted from the non-contact charge apparatus based on a magnetic field resonance relationship and a second communication unit capable of non-contact communication with the first communication unit by electric field coupling, and charge a battery by received power. The non-contact charge apparatus includes a first control unit, and the power receiving apparatus includes a storage unit, and a second control unit.

9 Claims, 8 Drawing Sheets

NON-CONTACT CHARGE AND COMMUNICATION SYSTEM

BACKGROUND OF THE INVENTION

1. Field of the Invention

The present invention relates to a non-contact charge and communication system including a non-contact charge system and a wireless communication system that transmit and receive power in a non-contact (wireless) manner.

2. Description of the Related Art

The electromagnetic induction system is known as a system for non-contact (wireless) supply of power.

Furthermore, in recent years, wireless power feed and charge systems employing a system called the magnetic field resonance system based on the electromagnetic resonance phenomenon are attracting attention.

Presently, in the non-contact power feed system based on the electromagnetic induction system, which has been already widely used, the power feed source and the power feed target (power receiving side) have to share magnetic flux. Therefore, the power feed source and the power feed target have to be disposed very close to each other for power sending with high efficiency, and axis alignment of the coupling is also important.

In contrast, the non-contact power feed system employing the electromagnetic resonance phenomenon has advantages that power can be transmitted across a longer distance compared with the electromagnetic induction system and the transmission efficiency is not greatly lowered even when the accuracy of axis alignment is somewhat low, because of the principle of the electromagnetic resonance phenomenon.

Besides the magnetic field resonance system, the electric field resonance system is also known as the system based on the electromagnetic resonance phenomenon.

A wireless power feed system employing this magnetic field resonance system requires no axis alignment and enables extension of the power feed distance.

Such a wireless power feed system can be used as e.g. a charge service station for a non-contact charge of a portable terminal such as an individually-owned cellular phone at a public place.

The following problems may exist when the charge service station at a public place is assumed.

It is troublesome to collect a small charge fee from the user each time.

The user does not realize much convenience if a charge is a pay service.

It is difficult to spread the charge service stations at public places unless there is not only a user's merit that a portable terminal can be charged but also a merit for the facility side that provides the charge service.

A technique disclosed in Japanese Patent Laid-open No. 2008-295191 has been proposed as a technique to solve the above-described problems.

This technique employs a system in which one coil is shared by a non-contact communication system and a non-contact charge system and non-contact communication and non-contact charge are carried out separately from each other in a time-division manner.

SUMMARY OF THE INVENTION

However, in the system in which one coil is shared by the non-contact communication system and the non-contact charge system and non-contact communication and non-contact charge are carried out separately in a time-division manner like this related art, the procedure is complex and it is difficult to optimize both of the non-contact communication and the non-contact charge and allow efficient operation.

There is a desire for the present invention to provide a non-contact charge and communication system capable of optimizing both of non-contact communication and non-contact charge and allowing efficient operation.

According to an embodiment of the present invention, there is provided a non-contact charge and communication system including non-contact charge apparatus configured to include a power transmitting device that transmits power for a charge by magnetic field coupling and a first communication unit that carries out non-contact communication by electric field coupling. The non-contact charge and communication system further includes power receiving apparatus configured to include a power receiving device that receives power transmitted from the non-contact charge apparatus based on a magnetic field resonance relationship and a second communication unit capable of non-contact communication with the first communication unit by electric field coupling, and charge a battery by received power. The non-contact charge apparatus includes a first control unit that transmits charge-exchange delivered data to the power receiving apparatus existing in a magnetic field of the power transmitting device by the first communication unit, and transmits power permitting a charge of the battery by the power transmitting device if the first communication unit receives a reception-completion notification of the charge-exchange delivered data by the second communication unit of the power receiving apparatus. The power receiving apparatus includes a storage unit and a second control unit that stores the charge-exchange delivered data that has been received in the storage unit and transmits the reception-completion notification to the first communication unit if the second communication unit receives the charge-exchange delivered data by the first communication unit.

The embodiment of the present invention can optimize both of non-contact communication and non-contact charge and allow efficient operation.

DETAILED DESCRIPTION OF THE PREFERRED EMBODIMENTS

Embodiments of the present invention will be described below in association with the drawings.

The order of the description is as follows.
1. First Embodiment (first configuration example of non-contact charge and communication system)
2. Second Embodiment (second configuration example of non-contact charge and communication system)

<1. First Embodiment>

Figure 1:
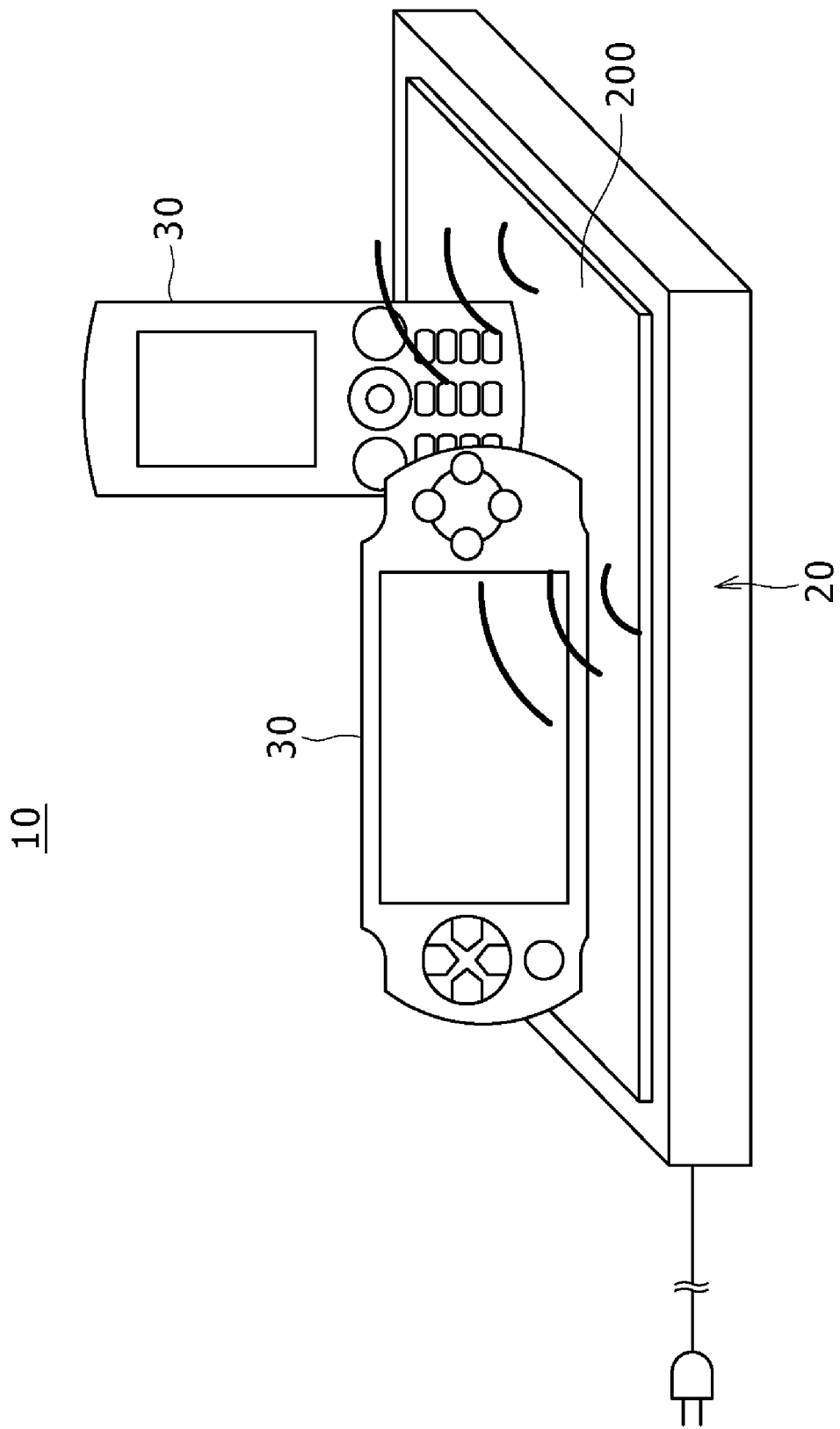
FIG. 1 is a diagram schematically showing the whole configuration of a non-contact charge and communication system according to a first embodiment of the present invention.

FIG. 1 is a diagram schematically showing the whole configuration of a non-contact charge and communication system according to a first embodiment of the present invention.

[Basic Configuration of Non-Contact Charge and Communication System]

This non-contact charge and communication system 10 has non-contact charge apparatus 20 and power receiving apparatus 30 that can be driven by a battery.

Basically, the non-contact charge apparatus 20 is formed into a box shape or a mat shape and has a function to carry out non-contact communication and non-contact charge in accordance with the condition to be described in detail later with the power receiving apparatus 30 that is disposed or placed at a position within the range in which charge and communication are possible for a charge of the battery.

The non-contact charge apparatus 20 has a station 200 that is the part on which the power receiving apparatus 30 is disposed.

The power receiving apparatus 30 is formed of a portable terminal such as a cellular phone that can be driven by a battery. It can get a charge service by the non-contact charge apparatus 20 and has a function of communication with the non-contact charge apparatus 20, such as reception of data delivered in exchange for a charge (hereinafter, this data will be referred to as the charge-exchange delivered data).

As just described, the non-contact charge and communication system 10 includes the "non-contact communication system" and the "non-contact charge system" that can simultaneously operate.

The non-contact charge and communication system 10 is constructed as a charge service station that enables a non-contact charge of an individually-owned portable terminal at a public place.

The non-contact charge and communication system 10 is constructed as a system that provides merits for both of the power receiving apparatus (portable terminal) 30 as the charged side and the non-contact charge apparatus 20 (charge service station) as the charging side.

The charge service station carries out a non-contact charge of a portable terminal in accordance with the following procedure.

The charge service station transmits charge-exchange delivered data of advertisement etc. to the portable terminal.

The charge service station transmits power for a non-contact charge to only the apparatus that has received this data.

For example the following data are delivered as the charge-exchange delivered data, which is a specific file (advertisement etc.) transmitted to the power receiving apparatus (portable terminal) 30 by the non-contact charge apparatus (service station) 20.

A movie preview etc. is delivered at a charge service station in a movie theater.

A coupon of a recommended menu, etc. is delivered at a charge service station in a coffee shop.

Tourist information about the surrounding area, etc. is delivered at a charge service station in a railroad station.

It is preferable for the signal transmitted by the non-contact communication system to have a high frequency in the GHz (gigahertz) band or higher-frequency band in order to enable high-speed transfer of large-size content.

It is preferable for the power transmitted by the non-contact charge system to be sent with a low frequency in the MHz (megahertz) band or lower-frequency band in order to handle high-output transmission and enhance the efficiency of the rectification circuit.

It is preferable that the non-contact communication system carry out communication via the near field of an electric field and the non-contact charge system send power via the near field of a magnetic field in order to prevent interference between the systems and realize stable operation when the non-contact communication system and the non-contact charge system are simultaneously operated in parallel.

Examples of the non-contact communication system for communication via the near field of an electric field include TransferJet.

The non-contact charge systems for power sending via the near field of a magnetic field include one based on electromagnetic induction and one based on magnetic resonance.

The non-contact power feed system employing the magnetic resonance phenomenon has advantages that power can be transmitted across a longer distance compared with the electromagnetic induction system and the transmission efficiency is not greatly lowered even when the accuracy of axis alignment is somewhat low, because of the principle of the electromagnetic resonance phenomenon.

The non-contact charge and communication system 10 of the present embodiment employs the magnetic field resonance system and is so configured that axis alignment is unnecessary and the power feed distance can be extended.

In the non-contact charge and communication system 10, the range of communication between a first communication unit of the non-contact charge apparatus 20 and a second communication unit of the power receiving apparatus 30 is within the range in which a power receiving device receives power transmitted from a power transmitting device based on a magnetic field resonance relationship for example. By making the communication-possible range be included in the power-receivable range, it can be assured that the power receiving apparatus that has received charge-exchange delivered data is placed at such a position as to be capable of receiving power.

[Specific Configuration of Non-Contact Charge and Communication System]

The specific configuration and functions of the non-contact charge and communication system will be described below.

Figure 2:
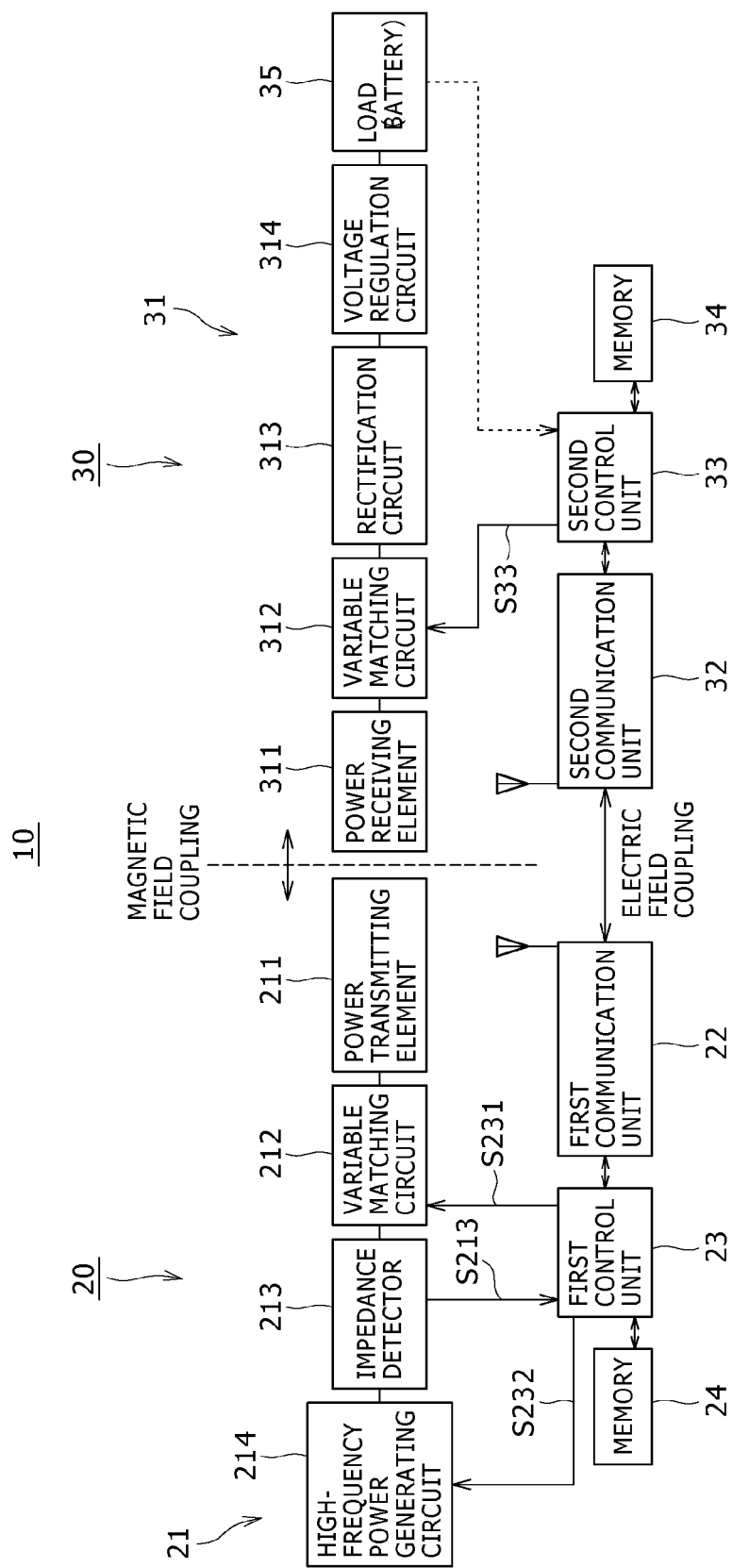
FIG. 2 is a block diagram showing the circuit configuration of non-contact charge apparatus and power receiving apparatus in the non-contact charge system according to the first embodiment.

FIG. 2 is a block diagram showing the circuit configuration of non-contact charge apparatus and power receiving apparatus in the non-contact charge system according to the first embodiment.

Figure 3:
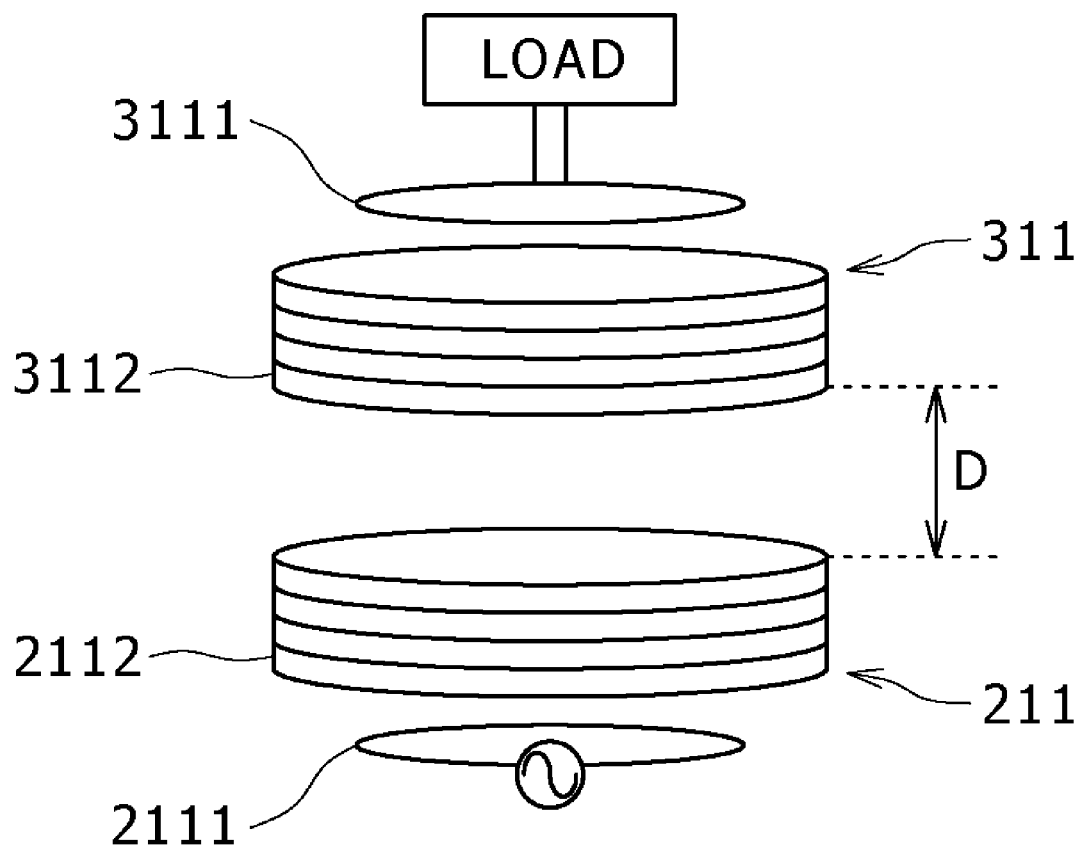
FIG. 3 is a diagram schematically showing the relationship between coils on the power transmitting side and coils on the power receiving side in the non-contact charge and communication system according to embodiments of the present invention.

FIG. 3 is a diagram schematically showing the relationship between the coils on the power transmitting side and the coils on the power receiving side in the non-contact charge and communication system according to the embodiments of the present invention.

Basically, the non-contact charge apparatus 20 includes a power transmitting device 21 that transmits power for a charge by magnetic field coupling, a first communication unit 22 that carries out non-contact communication by electric field coupling, a first control unit 23 that controls the power transmitting device 21 and the first communication unit 22, and a memory 24.

The power receiving apparatus 30 has a power receiving device 31 that receives power transmitted from the non-contact charge apparatus 20 based on a magnetic field resonance relationship, and a second communication unit 32 capable of non-contact communication with the first communication unit 22 by electric field coupling.

The power receiving apparatus 30 further includes a second control unit 33 that controls the power receiving device 31 and the second communication unit 32, and a memory 34 as a storage unit.

The power receiving apparatus 30 charges a battery 35 as a load by the power received by the power receiving device 31.

[Configuration of Non-Contact Charge Apparatus 20]

The power transmitting device 21 of the non-contact charge apparatus 20 has a power transmitting element unit 211, a variable matching circuit 212, an impedance detector 213, and a high-frequency power generating circuit 214.

The power transmitting element unit 211 has a power feed coil 2111 as a power feed element and a resonance coil 2112 as a resonance element. Although the resonance coil is referred to also as the resonant coil, the term "resonance coil" will be used in the description of the present embodiment.

The power feed coil 2111 is formed of an air core coil fed with an alternating current (AC) current.

The resonance coil 2112 is formed of an air core coil coupled to the power feed coil 2111 by electromagnetic induction. When the self-resonant frequency of the resonance coil 2112 corresponds with that of a resonance coil 3112 of the power receiving apparatus 30, the resonance coil 2112 enters the magnetic field resonance relationship to transmit power with high efficiency.

The variable matching circuit 212 has a function for impedance matching at the power feed point of the power feed coil 2111 in accordance with a control signal S231 supplied by the first control unit 23.

The impedance detector 213 has a function to detect the impedance of the power feed (power transmitting) side in the non-contact charge apparatus 20 based on e.g. high-frequency power generated by the high-frequency power generating circuit 214, and supplies the detection result as a signal S213 to the first control unit 23.

Furthermore, the impedance detector 213 supplies the high-frequency power generated by the high-frequency power generating circuit 214 to the side of the variable matching circuit 212.

The high-frequency power generating circuit 214 generates high-frequency power for non-contact (wireless) power transmission.

It is preferable for the high-frequency power generating circuit 214 to generate the high-frequency power with high efficiency, and therefore a switching amplifier or the like is used.

The high-frequency power generated by the high-frequency power generating circuit 214 is supplied to the variable matching circuit 212 via the impedance detector 213 and fed (applied) to the power feed coil 2111 of the power transmitting element unit 211.

The high-frequency power generating circuit 214 can vary the magnitude of the generated power in accordance with a control signal S232 of the first control unit 23.

Furthermore, whether or not the high-frequency power generating circuit 214 generates power is controlled (whether it is in the on-state or the off-state is controlled) in accordance with the control signal S232 of the first control unit 23.

The first communication unit 22 includes a function of non-contact communication by electric field coupling and can exchange impedance control information, authentication information, charge-exchange delivered data, confirmation signal, reception-completion notification, data-holding notification, non-data-holding notification, and so forth with the second communication unit 32 of the power receiving apparatus 30.

The first communication unit 22 is capable of non-contact communication with the second communication unit 32 of the power receiving apparatus 30 under control by the first control unit 23 by using a high frequency in the GHz (gigahertz) band or higher-frequency band in order to enable high-speed transfer of large-size content.

In response to the detection result by the impedance detector 213, the first control unit 23 outputs the first control signal S231 to the variable matching circuit 212 so that high-efficiency power transmission may be permitted through impedance matching by the variable matching circuit 212.

In other words, the first control unit 23 carries out control so that the self-resonant frequency of the resonance coil 2112 may correspond with that of the resonance coil 3112 of the power receiving apparatus 30 and the resonance coil 2112 may enter the magnetic field resonance relationship to transmit power with high efficiency.

The first control unit 23 controls power transmission by the power transmitting device 21 depending on the state of communication of the first communication unit 22 with the second communication unit 32 of the power receiving apparatus 30.

The first control unit 23 includes an authentication function to confirm that the power receiving apparatus 30 is compatible with this charge and communication system by the first communication unit 22 with the second communication unit 32 of the power receiving apparatus 30.

The first control unit 23 does not carry out power transmission by the power transmitting device 21 if authentication confirmation is not achieved. For example, the first control unit 23 carries out power non-generation control for the high-frequency power generating circuit 214 by the control signal S232 so that generation of high-frequency power may be prevented.

If authentication is achieved, the first control unit 23 transmits charge-exchange delivered data CDT to the power receiving apparatus existing in the magnetic field of the power transmitting device 21 by the first communication unit 22.

If the first communication unit 22 receives a reception-completion notification RED as the reply to the charge-exchange delivered data CDT by the second communication unit 32 of the power receiving apparatus 30, the first control unit 23 carries out control so as to send (transmit) e.g. charge power permitting a full charge of the battery 35 by the power transmitting device 21.

The first control unit 23 transmits a confirmation signal RNZ to confirm whether or not the charge-exchange delivered data CDT is held in a state in which the first communication unit 22 is capable of communicating with the second communication unit 32.

If the first control unit 23 receives a non-data-holding notification NDH as the reply to the confirmation signal RNZ, it transmits the charge-exchange delivered data CDT by the first communication unit 22.

Furthermore, if the first communication unit 22 receives the reception-completion notification RED of the charge-exchange delivered data CDT by the second communication unit 32 of the power receiving apparatus 30 as described above, the first control unit 23 transmits e.g. charge power permitting a full charge of the battery 35 by the power transmitting device 21.

When the first communication unit 22 is in such a state as to be capable of communicating with the second communication unit 32 (after authentication confirmation), the first control unit 23 transmits the confirmation signal RNZ to confirm whether or not the charge-exchange delivered data CDT is held.

If the first control unit 23 receives the data-holding notification DHL as the reply to the confirmation signal RNZ, it transmits e.g. charge power permitting a full charge of the battery 35 by the power transmitting device 21.

The first control unit 23 periodically transmits the confirmation signal RNZ to confirm whether or not the charge-exchange delivered data CDT is held as polling by the first communication unit 22.

The first control unit 23 has a function to stop power transmission by the power transmitting device 21 if the first control unit 23 does not receive the data-holding notification DHL as the reply to the confirmation signal RNZ.

Furthermore, the first control unit 23 has a function to intermittently carry out power transmission by the power transmitting device 21 irrespective of whether or not the power receiving apparatus 30 is present and switch the power transmission to continuous power transmission if the first communication unit 22 becomes capable of starting communication with the second communication unit 32 of the power receiving apparatus 30 (if authentication confirmation is achieved).

The first control unit 23 transmits power by the power transmitting device 21, and stops the power transmission by the power transmitting device 21 if the first control unit 23 receives a charge-completion notification CGE by the second communication unit 32 of the power receiving apparatus 30.

The power receiving device 31 of the power receiving apparatus 30 includes a power receiving element unit 311, a variable matching circuit 312, a rectification circuit 313, and a voltage regulation circuit 314.

The power receiving element unit 311 has a power feed coil 3111 as a power feed element and the resonant (resonance) coil 3112 as a resonance element.

The power feed coil 3111 is fed with an AC current from the resonance coil 3112 by electromagnetic induction.

As the configuration relating to the power feed coil 3111, made by the power feed coil 3111 and the variable matching circuit 312, a configuration similar to that of the non-contact charge apparatus side can be employed.

The resonance coil 3112 is formed of an air core coil coupled to the power feed coil 3111 by electromagnetic induction. When the self-resonant frequency of the resonance coil 3112 corresponds with that of the resonance coil 2112 of the non-contact charge apparatus 20, the resonance coil 3112 enters the magnetic field resonance relationship to transmit power with high efficiency.

The variable matching circuit 312 has a function for impedance matching at the load end of the power feed coil 3111 in accordance with a control signal S33 supplied by the second control unit 33.

This impedance matching control by the variable matching circuit 312 is so carried out as to follow control on the side of the non-contact charge apparatus 20 in accordance with control information of the first control unit 23 of the non-contact charge apparatus 20, received via the second communication unit 32, for example.

The rectification circuit 313 rectifies received AC power and supplies the rectified power to the voltage regulation circuit 314 as a direct current (DC) power.

The voltage regulation circuit 314 converts the DC power supplied by the rectification circuit 313 to DC voltage suitable for the specifications of the electronic apparatus as the supply target, and supplies the regulated DC voltage to the battery 35 as a load.

The second communication unit 32 includes a function of non-contact communication by electric field coupling and can exchange impedance control information, authentication information, charge-exchange delivered data, confirmation signal, reception-completion notification, data-holding notification, non-data-holding notification, and so forth with the first communication unit 22 of the non-contact charge apparatus 20.

The first communication unit 22 is capable of non-contact communication with the second communication unit 32 of the power receiving apparatus 30 under control by the first control unit 23 by using a high frequency in the GHz (gigahertz) band or higher-frequency band in order to enable high-speed transfer of large-size content.

The second control unit 33 can exchange various kinds of information with the first communication unit 22 and the first control unit 23 of the non-contact charge apparatus 20 via the second communication unit 32 by wireless communication.

These various kinds of information include pieces of information such as impedance control information, authentication information, charge-exchange delivered data, confirmation signal, reception-completion notification, data-holding notification, and non-data-holding notification.

The second control unit 33 controls the variable matching circuit 312 in such a manner as to follow control on the side of the non-contact charge apparatus 20 in accordance with control information of the first control unit 23 of the non-contact charge apparatus 20, received via the second communication unit 32.

The second control unit 33 outputs the control signal S33 to the variable matching circuit 312 so that high-efficiency power transmission may be permitted through impedance matching by the variable matching circuit 312.

If the second communication unit 32 receives the charge-exchange delivered data CDT by the first communication unit 22, the second control unit 33 stores the charge-exchange delivered data CDT that has been received in the memory 34 and transmits the reception-completion notification RED to the first communication unit 22 via the second communication unit 32.

The second control unit 33 receives the confirmation signal RNZ in a state in which the second communication unit 32 is capable of communicating with the first communication unit 22, and transmits the non-data-holding notification NDH to the first communication unit 22 by the second communication unit 32 if the charge-exchange delivered data CDT is not held in the memory 34.

Furthermore, if the second communication unit 32 receives the charge-exchange delivered data CDT by the first communication unit 22, the second control unit 33 stores the charge-exchange delivered data CDT that has been received in the memory 34 and transmits the reception-completion notification RED to the first communication unit 22 via the second communication unit 32.

The second control unit 33 receives the confirmation signal RNZ in a state in which the second communication unit 32 is capable of communicating with the first communication unit 22, and transmits the data-holding notification DHL to the first communication unit 22 by the second communication unit 32 if the charge-exchange delivered data CDT is held in the memory 34.

In addition, the second control unit 33 transmits the charge-completion notification CGE to the first communication unit 22 by the second communication unit 32 if a charge of the battery 35 is completed and the fully-charged state is obtained.

One example of the operation of the above-described non-contact charge and communication system 10 will be described below.

Figure 4:
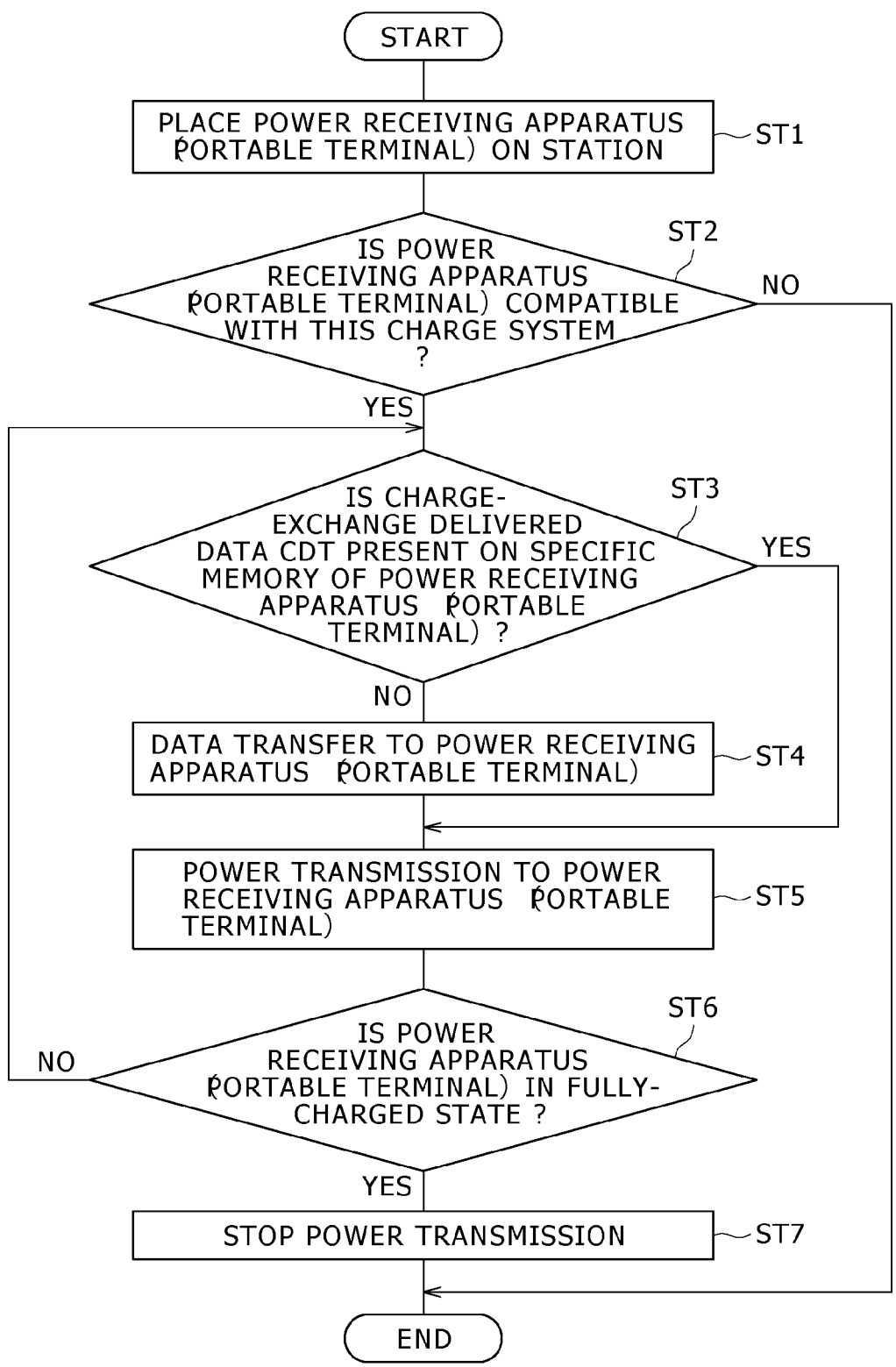
FIG. 4 is a flowchart for explaining the basic operation of the non-contact charge and communication system according to the first embodiment.

FIG. 4 is a flowchart for explaining the basic operation of the non-contact charge and communication system 10 according to the first embodiment.

If the power receiving apparatus (portable terminal) 30 is placed on the station 200 of the non-contact charge apparatus 20 (ST1), authentication confirmation is made by non-contact communication as to whether the power receiving apparatus (portable terminal) 30 placed thereon is compatible with the charge service system (ST2).

If it is confirmed in the step ST2 that the power receiving apparatus (portable terminal) 30 is not compatible with the charge service system, the non-contact charge apparatus 20 does not carry out power transmission by the power transmitting device 21.

If it is confirmed in the step ST2 that the power receiving apparatus (portable terminal) 30 is compatible with the charge service system, the first control unit 23 of the non-contact charge apparatus 20 carries out the following control.

At this time, the first communication unit 22 is disposed at a distance of about 1 to 2 cm from the second communication unit 32 of the power receiving apparatus (portable terminal) 30 and thus is in such a state as to be capable of communicating with the second communication unit 32.

The first control unit 23 transmits the confirmation signal RNZ to confirm whether or not the charge-exchange delivered data CDT is held to the second communication unit 32 by the first communication unit 22 (ST3).

When the charge-exchange delivered data CDT is not held in the memory 34, the second control unit 33 of the power receiving apparatus (portable terminal) 30 that has received the confirmation signal RNZ via the second communication unit 32 transmits the non-data-holding notification NDH to the first communication unit 22 by the second communication unit 32.

In this case, upon receiving the non-data-holding notification NDH as the reply to the confirmation signal RNZ, the first control unit 23 transmits the charge-exchange delivered data CDT by the first communication unit 22 (ST4).

When the second communication unit 32 receives the charge-exchange delivered data CDT by the first communication unit 22, the second control unit 33 stores the charge-exchange delivered data CDT that has been received in the memory 34 and transmits the reception-completion notification RED to the first communication unit 22 via the second communication unit 32.

When the first communication unit 22 receives the reception-completion notification RED of the charge-exchange delivered data CDT by the second communication unit 32 of the power receiving apparatus 30, the first control unit 23 transmits e.g. charge power permitting a full charge of the battery 35 by the power transmitting device 21 (ST5).

On the other hand, when the charge-exchange delivered data CDT is held in the memory 34, the second control unit 33 of the power receiving apparatus (portable terminal) 30 that has received the confirmation signal RNZ via the second communication unit 32 transmits the data-holding notification DHL to the first communication unit 22 by the second communication unit 32.

In this case, the first control unit 23 does not execute the processing of transmitting the charge-exchange delivered data CDT and moves to the processing of the step ST5 to transmit charge power.

In the power receiving apparatus (portable terminal) 30, the battery 35 is charged by the power receiving device 31. When the charge of the battery 35 is completed and the fully-charged state is obtained, the second control unit 33 transmits the charge-completion notification CGE to the first communication unit 22 by the second communication unit 32.

The first control unit 23 transmits power by the power transmitting device 21 and stops the power transmission by the power transmitting device 21 upon receiving the charge-completion notification CGE by the second communication unit 32 of the power receiving apparatus 30 (ST7).

Until receiving the charge-completion notification CGE, the first control unit 23 periodically transmits the confirmation signal RNZ to confirm whether or not the charge-exchange delivered data CDT is held as polling by the first communication unit 22.

If the first control unit 23 does not receive the data-holding notification DHL as the reply to the confirmation signal RNZ, it stops power transmission by the power transmitting device 21.

In this manner, in this non-contact charge and communication system 10, confirmation is periodically made by using the non-contact communication system as to whether the charge-exchange delivered data CDT as a specific file exists on the specific memory of the power receiving apparatus (portable terminal) 30 while a non-contact charge is carried out. If the existence of the file is not confirmed, immediately the non-contact charge is stopped.

The reason why the existence of the specific file is periodically confirmed during the charge is as follows.

Specifically, for example possibly the power receiving apparatus (portable terminal) 30 placed on the non-contact charge apparatus 20 is replaced by another object, e.g. a portable terminal that is not compatible with this charge service or a foreign object such as a metal plate after the start of power transmission, so that problems of heat generation etc. are caused. The periodic confirmation is to prevent these problems.

At this time, by simultaneously operating the non-contact communication system and the non-contact charge system in parallel, it can be accordingly confirmed whether power is transmitted to the proper counterpart without stopping the charge.

Even when temporarily the user gets away from the place of the charge service station and the power feed is stopped, the power feed is restarted without data transmission if it can be confirmed that the power receiving apparatus (portable terminal) 30 holds the specific data when the user's apparatus is brought close to the station 200 again.

By the way, if the remaining battery level of the power receiving apparatus (portable terminal) 30 before a charge is zero or in a state close to zero, it may be impossible to carry out apparatus authentication (confirmation as to whether the power receiving apparatus 30 is compatible with this service)

and transfer of the charge-exchange delivered data CDT as specific data (advertisement etc.) by non-contact communication in some cases.

Figure 5:
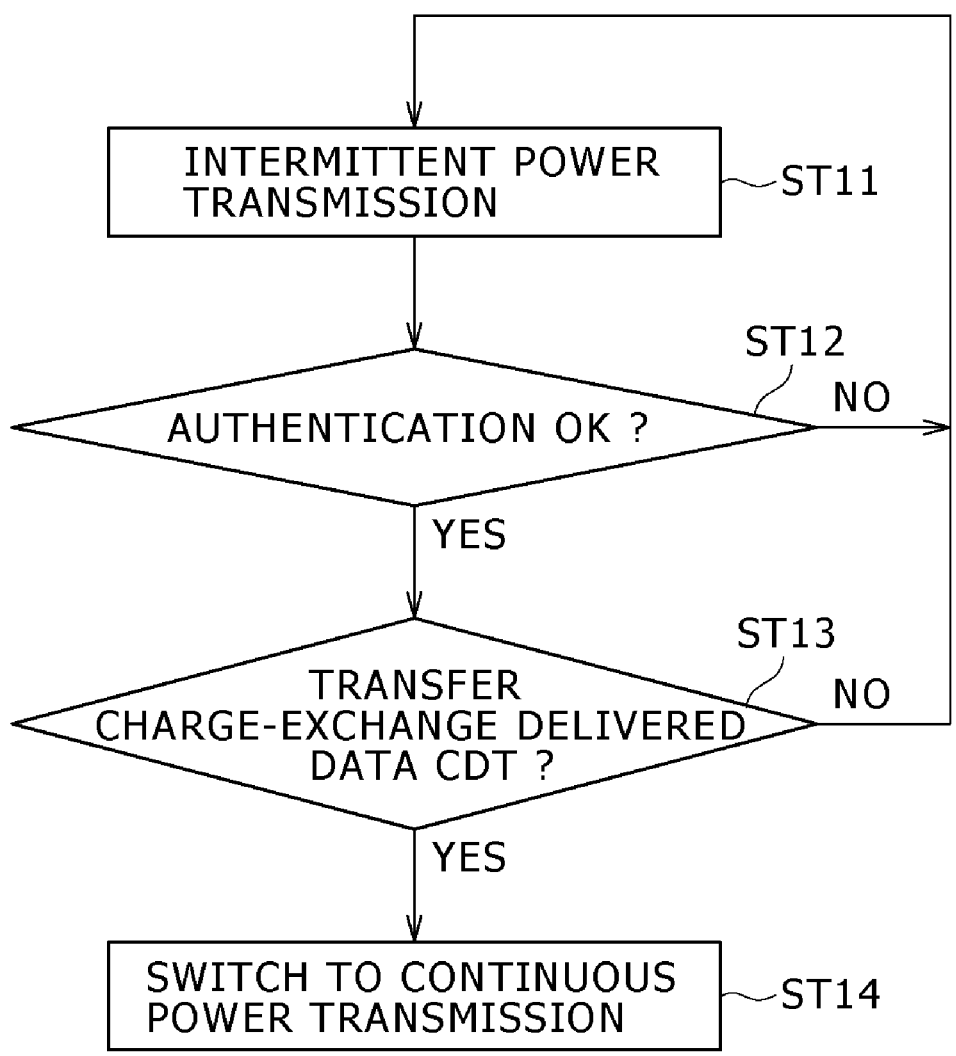
FIG. 5 is a diagram for explaining the outline of power transmission control for the case in which the remaining battery level of the power receiving apparatus (portable terminal) before a charge is zero or in a state close to zero in the first embodiment.

For this case, e.g. a method shown in a flowchart of FIG. 5 may be employed. Specifically, in this method, the non-contact charge apparatus 20 keeps on intermittently transmitting power, e.g. once every ten seconds for one second, irrespective of whether or not the power receiving apparatus (portable terminal) 30 is present (ST11).

If the power receiving apparatus (portable terminal) 30 is placed on the station 200 and apparatus authentication and transfer of the charge-exchange delivered data CDT as specific data are carried out by the non-contact communication system (ST12 and ST13), the power transmission is switched to continuous power transmission (ST14).

<2. Second Embodiment>

Figure 6:
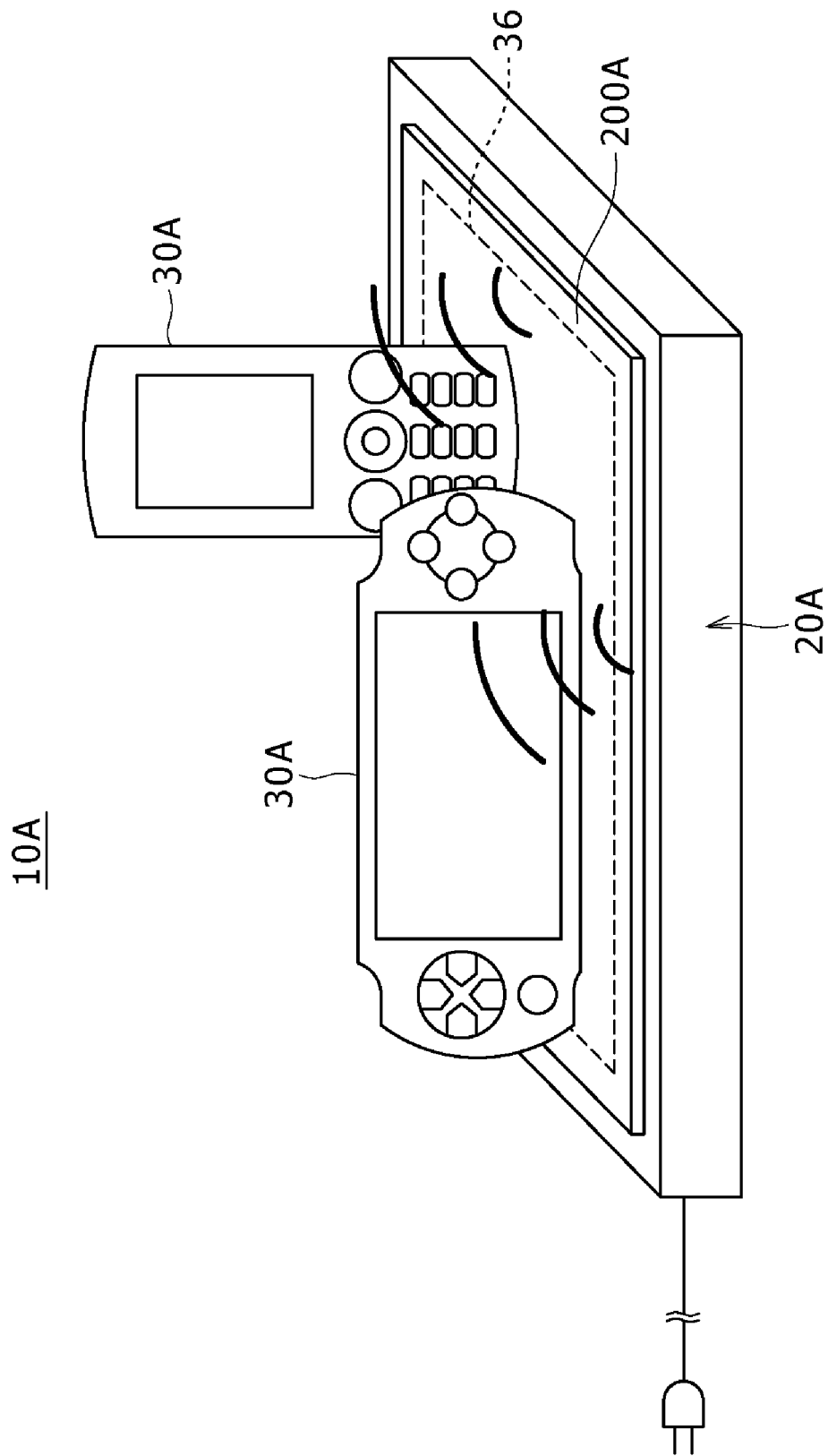
FIG. 6 is a diagram schematically showing the whole configuration of a non-contact charge and communication system according to a second embodiment of the present invention.

FIG. 6 is a diagram schematically showing the whole configuration of a non-contact charge and communication system according to a second embodiment of the present invention.

Figure 7:
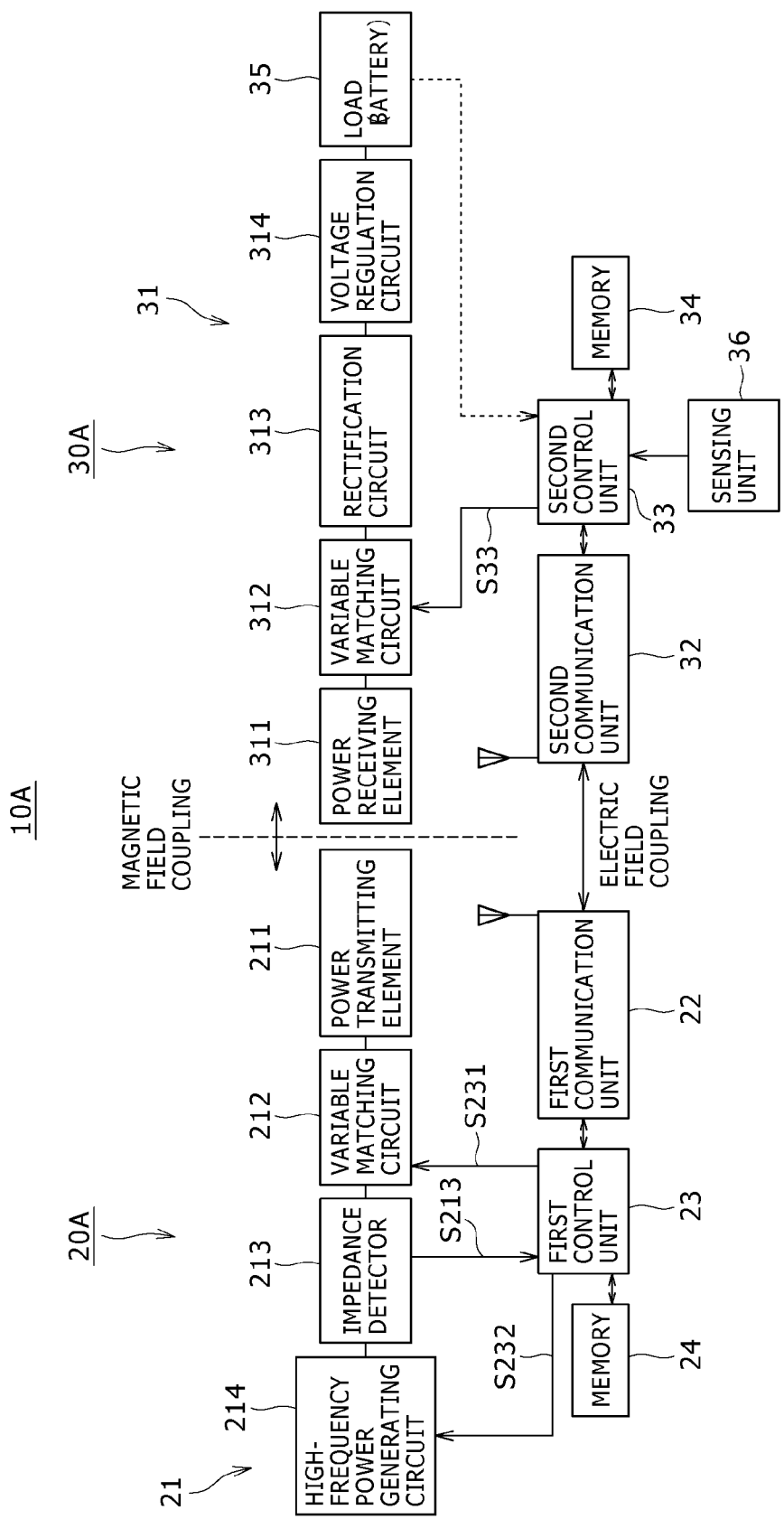
FIG. 7 is a block diagram showing the circuit configuration of non-contact charge apparatus and power receiving apparatus in the non-contact charge system according to the second embodiment.

FIG. 7 is a block diagram showing the circuit configuration of non-contact charge apparatus and power receiving apparatus in the non-contact charge system according to the second embodiment.

The difference of a non-contact charge and communication system 10A according to the second embodiment from the non-contact charge and communication system 10 according to the first embodiment is a configuration to address the case in which the remaining battery level of the power receiving apparatus (portable terminal) 30 before a charge is zero or in a state close to zero.

In this non-contact charge and communication system 10A, a station 200A of non-contact charge apparatus 20A includes a sensing unit 36 to sense that the power receiving apparatus 30A exists at a communication-possible position.

The sensing unit 36 is formed of e.g. a pressure sensor.

Figure 8:
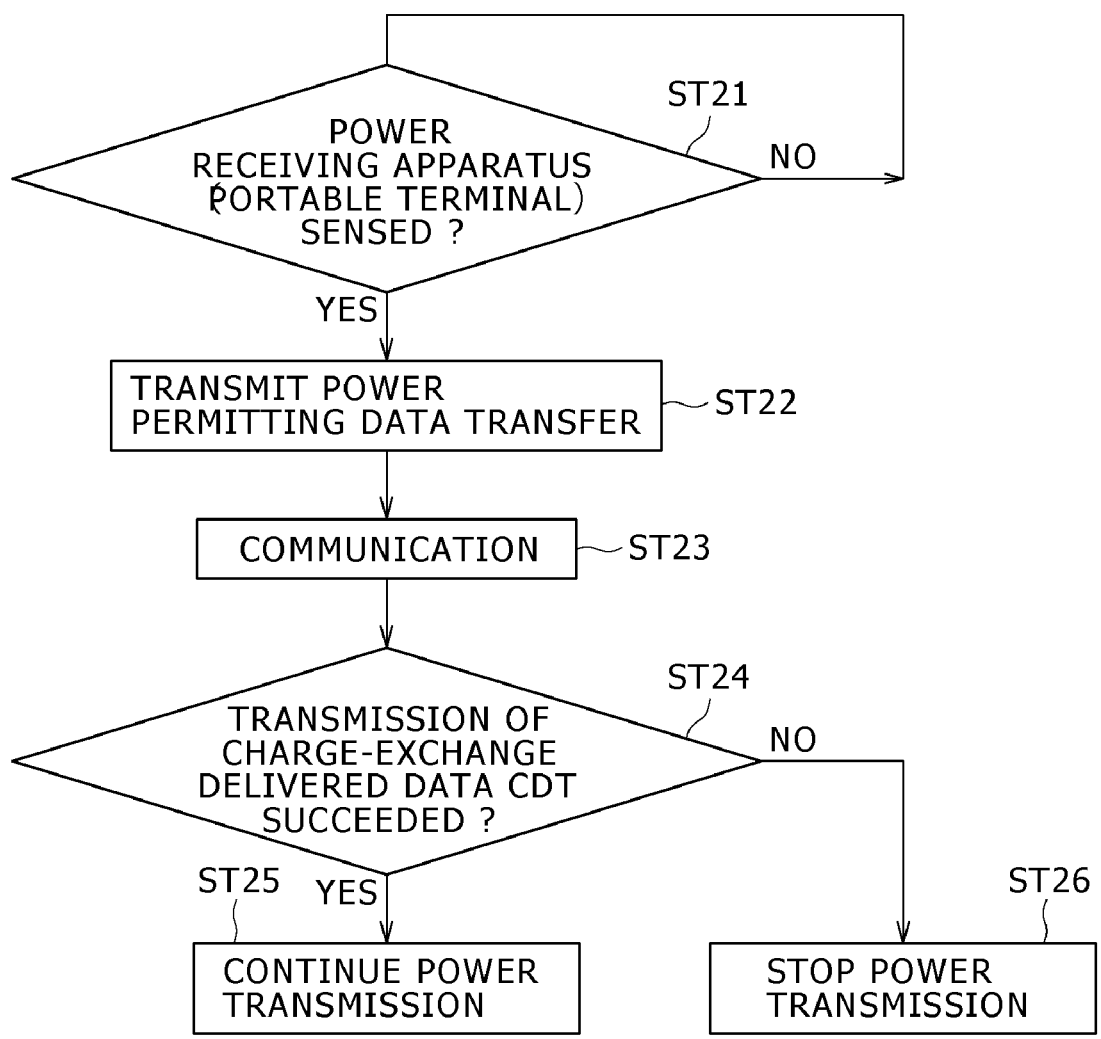
FIG. 8 is a diagram for explaining the outline of power transmission control for the case in which the remaining battery level of the power receiving apparatus (portable terminal) before a charge is zero or in a state close to zero in the second embodiment.

FIG. 8 is a diagram for explaining the outline of power transmission control for the case in which the remaining battery level of the power receiving apparatus (portable terminal) 30A before a charge is zero or in a state close to zero in the second embodiment.

In this case, if the sensing unit 36 senses that power receiving apparatus exists at a communication-possible position (ST21), the first control unit 23 transmits power necessary for data transfer (ST22), and starts communication with the second communication unit 32 by the first communication unit 22 (ST23).

In the step ST23, apparatus authentication and transfer of the charge-exchange delivered data CDT as specific data are carried out by the non-contact communication system.

If the transmission of the charge-exchange delivered data results in success (ST24), the power transmission is continued (ST25). If the transmission results in failure, the power transmission is stopped (ST26).

In the failure case, the power transmission is not carried out until the power receiving apparatus (portable terminal) 30A is removed from the station 200A and thereafter the sensing unit 36 senses that the power receiving apparatus (portable terminal) 30A is placed on the station 200A again.

As described above, the embodiments can achieve the following advantageous effects.

Data of advertisement etc. can be sent to the user instead of collection of a small charge fee.

The user side can get a charge service at no fee and thus can readily use the service.

Furthermore, useful information can also be obtained. Because there are merits for not only the user, who can charge a portable terminal, but also the facility side, which provides the charge service, the spread of the charge service station at a public place can be promoted.

By simultaneously operating the non-contact communication system and the non-contact charge system in parallel, the procedure of apparatus authentication can be simplified.

Furthermore, it can be accordingly confirmed whether power is transmitted to the proper counterpart without stopping the charge.

The present application contains subject matter related to that disclosed in Japanese Priority Patent Application JP 2010-145325 filed in the Japan Patent Office on Jun. 25, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A non-contact charge and communication system comprising:
    non-contact charge apparatus including a power transmitting device that transmits power for a charge by magnetic field coupling and a first communication unit that carries out non-contact communication by electric field coupling; and
    power receiving apparatus including a power receiving device that receives power transmitted from the non-contact charge apparatus based on a magnetic field resonance relationship and a second communication unit capable of non-contact communication with the first communication unit by electric field coupling, and charge a battery by received power,
    wherein,
    the non-contact charge apparatus including a first control unit that transmits charge-exchange delivered data to the power receiving apparatus existing in a magnetic field of the power transmitting device by the first communication unit, and transmits power permitting a charge of the battery by the power transmitting device if the first communication unit receives a reception-completion notification of the charge-exchange delivered data by the second communication unit of the power receiving apparatus, and
    the power receiving apparatus includes (a) a storage unit, and (b) a second control unit that stores the charge-exchange delivered data that has been received in the storage unit and transmits the reception-completion notification to the first communication unit if the second communication unit receives the charge-exchange delivered data by the first communication unit.

2. The non-contact charge and communication system according to claim 1, wherein:
    the first control unit of the non-contact charge apparatus transmits a confirmation signal to confirm whether or not the charge-exchange delivered data is held in a state in which the first communication unit is capable of communicating with the second communication unit,
    the first control unit transmits the charge-exchange delivered data by the first communication unit if the first control unit receives a non-data-holding notification as a reply to the confirmation signal, and the first control unit transmits power permitting a charge of the battery by the power transmitting device if the first communication unit receives the reception-completion notification of the charge-exchange delivered data by the second communication unit of the power receiving apparatus, the second control unit of the power receiving apparatus receives the confirmation signal in a state in which the second communication unit is capable of communicating with the first communication unit, and transmits the non-data-holding notification to the first communication unit by the second communication unit if the charge-exchange delivered data is not held in the storage unit, and the second control unit stores the charge-exchange delivered data that has been received in the storage unit and transmits the reception-completion notification to the first communication unit if the second communication unit receives the charge-exchange delivered data by the first communication unit.

3. The non-contact charge and communication system according to claim 1, wherein:

the first control unit of the non-contact charge apparatus transmits a confirmation signal to confirm whether or not the charge-exchange delivered data is held in a state in which the first communication unit is capable of communicating with the second communication unit, the first control unit transmits power permitting a charge of the battery by the power transmitting device if the first control unit receives a data-holding notification as a reply to the confirmation signal, and the second control unit of the power receiving apparatus receives the confirmation signal in a state in which the second communication unit is capable of communicating with the first communication unit, and transmits the data-holding notification to the first communication unit by the second communication unit if the charge-exchange delivered data is held in the storage unit.

4. The non-contact charge and communication system according to claim 1, wherein the first control unit of the non-contact charge apparatus (a) periodically transmits the confirmation signal to confirm whether or not the charge-exchange delivered data is held by the first communication unit, and (b) stops power transmission by the power transmitting device if the first control unit does not receive a data-holding notification as a reply to the confirmation signal.

5. The non-contact charge and communication system according to claim 1, wherein the first control unit of the non-contact charge apparatus (a) intermittently carries out power transmission by the power transmitting device irrespective of whether or not the power receiving apparatus is present, and (b) switches power transmission to continuous power transmission if the first communication unit becomes capable of starting communication with the second communication unit of the power receiving apparatus.

6. The non-contact charge and communication system according to claim 1, wherein:

the non-contact charge apparatus includes a sensing unit to sense that the power receiving apparatus exists at a communication-possible position, the first control unit transmits power necessary for data transfer and starts communication with the second communication unit by the first communication unit if the sensing unit senses that the power receiving apparatus exists at a communication-possible position, and the first control unit continues power transmission if transmission of the charge-exchange delivered data results in success, and stops the power transmission if the transmission results in failure.

7. The non-contact charge and communication system according to claim 1, wherein a range of communication between the first communication unit of the non-contact charge apparatus and the second communication unit of the power receiving apparatus is within a range in which the power receiving device receives power transmitted from the power transmitting device based on a magnetic field resonance relationship.

8. The non-contact charge and communication system according to claim 1, wherein the first control unit of the non-contact charge apparatus includes an authentication function to confirm that the power receiving apparatus is compatible with the charge and communication system by the first communication unit with the second communication unit of the power receiving apparatus.

9. The non-contact charge and communication system according to claim 8, wherein the first control unit of the non-contact charge apparatus does not carry out power transmission by the power transmitting device if authentication confirmation is not achieved.

* * * * *